United States Patent [19]

Hart

[11] 4,297,063
[45] Oct. 27, 1981

[54] TELESCOPING SELF-RETAINING SAFETY BOLT ASSEMBLY

[75] Inventor: Dale H. Hart, Seal Beach, Calif.

[73] Assignee: Hi Shear Corporation, Torrance, Calif.

[21] Appl. No.: 47,370

[22] Filed: Jun. 11, 1979

[51] Int. Cl.³ .............................................. F16B 39/02
[52] U.S. Cl. ..................................... 411/199; 411/338; 411/213
[58] Field of Search ................... 151/6, 2 R, 69, 9, 24, 151/63, 62, 61; 24/211 P, 211 R; 85/4, 5 B; 411/199, 210, 318, 317, 316, 338, 213

[56] References Cited

U.S. PATENT DOCUMENTS

| | | | |
|---|---|---|---|
| 579,547 | 3/1897 | Perry | 151/9 |
| 1,252,554 | 1/1918 | Dillon | 151/6 |
| 1,259,214 | 3/1918 | De Roja | 85/4 X |
| 2,906,311 | 9/1959 | Boyd | 151/9 |
| 3,243,837 | 4/1966 | Smith | 85/5 B X |
| 3,361,176 | 1/1968 | Jansen | 151/6 |
| 3,390,712 | 2/1968 | McKay | 151/69 X |
| 3,561,516 | 2/1971 | Reddy | 151/9 |
| 3,712,356 | 1/1973 | Petroshanoff | 151/6 |
| 3,771,410 | 11/1973 | Swindt | 85/4 X |
| 4,016,914 | 4/1977 | Zurko | 85/5 B X |

Primary Examiner—Ramon S. Britts
Attorney, Agent, or Firm—Donald D. Mon

[57] ABSTRACT

A self-retaining safety bolt assembly having a headed end, a cylindrical shank, and a pin tail nut with a tubular shank telescoping over the cylindrical shank with means near the headed end to retain the tubular shank on the cylindrical shank in a hole in a workpiece. An axial passage opening into the headed end intercepts a laterally-extending passage wherein a dog is laterally reciprocable so as to be extendable beyond a maximum diameter of the cylindrical shank or to be entirely retracted within it. A cam member having a pair of oppositely facing cam surfaces is axially slidable in the axial passage. The dog has a pair of followers, one on each side, bearing against the oppositely directed cam surfaces whereby the lateral position of the dog is uniquely a function of the axial position of the cam member. Bias means is provided to bias the cam member to a position corresponding to maximum extension of the dog into engagement with a groove in the tubular shank of the pin tail nut to lock the telescoping pin tail nut on the cylindrical shank.

9 Claims, 6 Drawing Figures

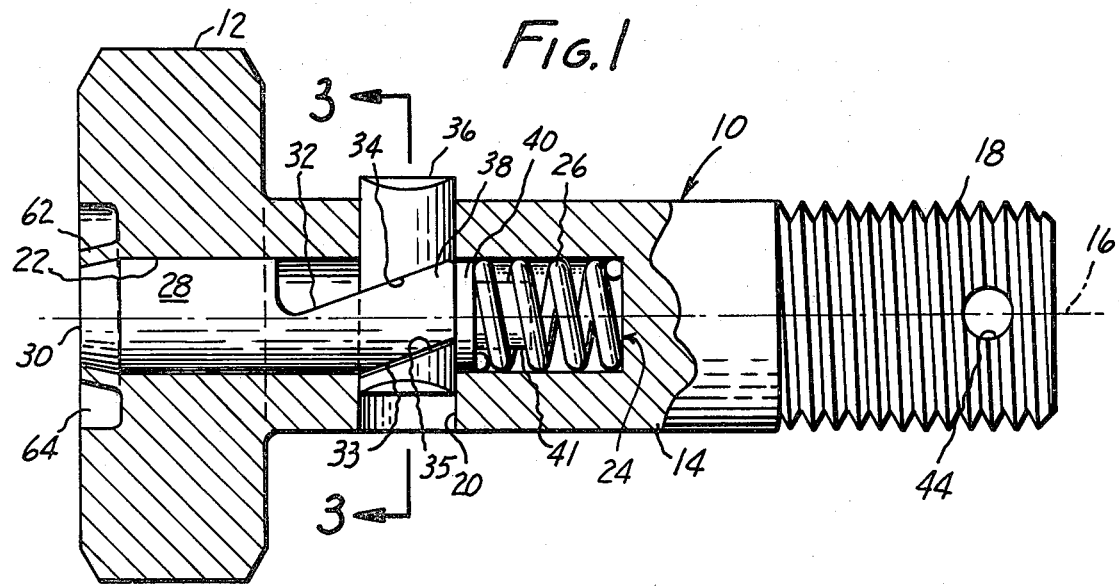
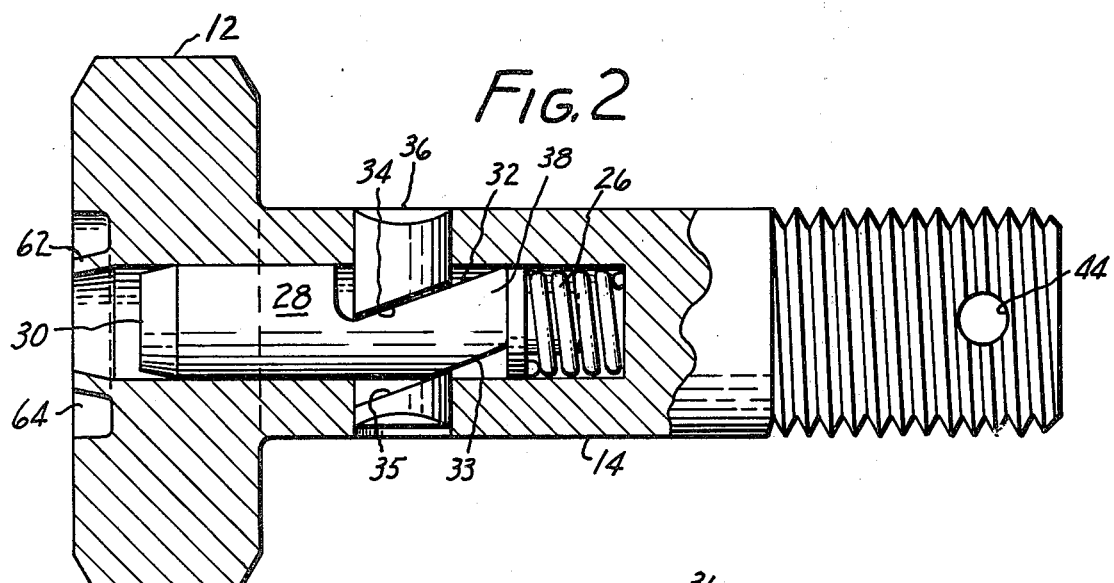
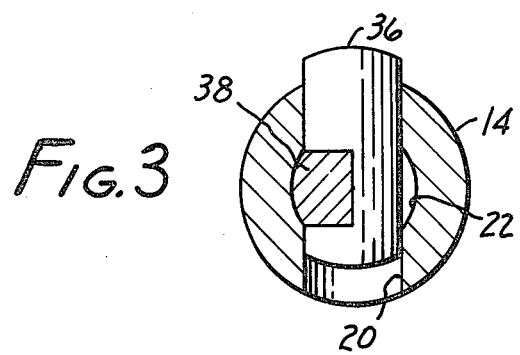

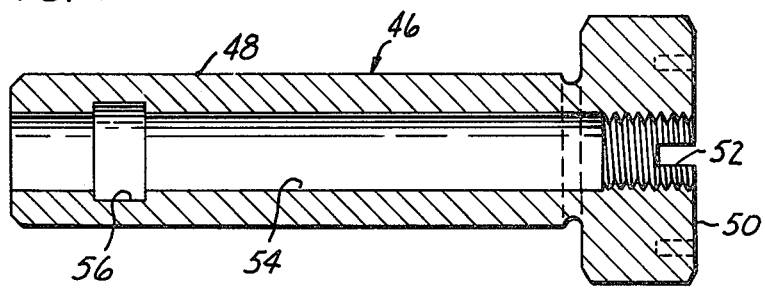
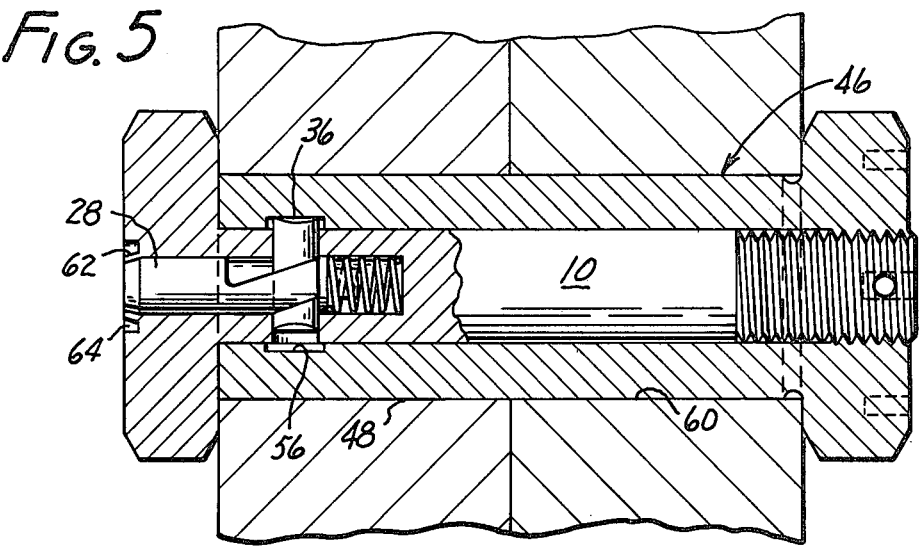
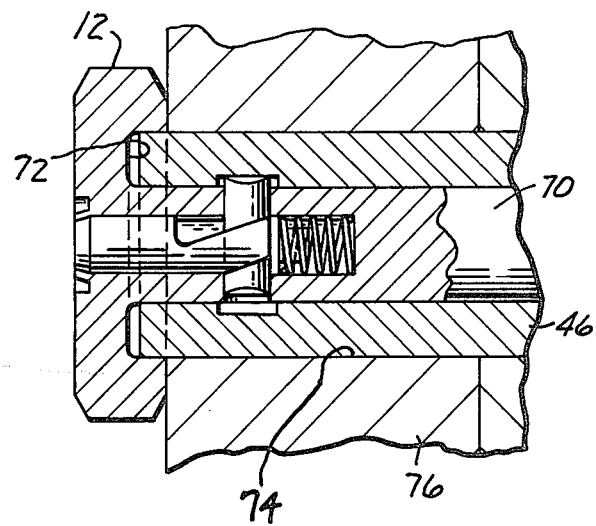

TELESCOPING SELF-RETAINING SAFETY BOLT ASSEMBLY

This invention relates to self retaining safety bolt assemblies.

Especially in aircraft and other heavy type installations, the principal utility of a bolt is to withstand shear loads exerted laterally relative to its axis. In practice, a nut is threaded onto the bolt to hold the bolt in the hole, and also to tighten the joint so it is resistant to fatigue forces and to axial separative loads. However, the axial loads are ordinarily of considerably lesser magnitude than the shear loads and are not the primary intended function of the bolt.

When a nut shakes loose, or the mechanic neglects to put the nut on, a situation of very great danger arises, because the bolt could simply fall out of the hole, leaving disabled some critical element of the installation such as a landing gear or some other pivotally mounted device. To overcome this risk, there has been devised a class of bolt known as the "safety bolt" which includes within itself inherent means for axial retention, which while not as strong as a nut threaded onto the bolt, still will hold the bolt in its hole under critical situations, and enable the bolt to perform its primary intended function. If the nut is forgotten or shaken off, the bolt will remain in place under many or most important conditions. Among the prior art efforts to supply a safety bolt are the following: U.S. Pat. Nos.: Nicholson 960,999, Myers 3,046,827, Passauer 1,433,410, McKay 3,390,712, Blair 1,597,667, Reddy 3,561,516, Boyd 2,906,311, Germany Pat. No. 448,650 (1927).

A common disadvantage of the prior art is the provision of dogs whose position is possibly arbitrary relative to the position of its actuator. This is because the actuators can become decoupled from the dog or other latching means, with the exception of the Passauer patent which requires pivotal connections and excessively large passages through the sides of the bolt which weakens the strength of the bolt. Further, the nut can still be shaken off leaving a critical function in a dangerously weakened condition with only the dog holding parts together.

Still another disadvantage of known safety bolts is that when the nut falls off, there remains only one head on the bolt itself, and articles can fall off the bolt.

It is an object of this invention to provide a two-piece safety bolt which prevents the loss of any part.

A device according to this invention includes a pair of telescopic elements together with an externally actuable locking dog held to one and engageable to the other, releasably to hold them in the assembled condition.

The above and other features of the invention will become fully understood from the following detailed description and the accompanying drawings in which:

FIGS. 1 and 2 are axial sections of part of the presently preferred embodiment of the invention.

FIG. 3 is a cross-section taken at line 3—3 in FIG. 1;

FIG. 4 is an axial section of another part of the presently preferred embodiment of the invention;

FIG. 5 shows the assembly of the parts of FIGS. 1 and 4, installed in a workpiece; and FIG. 6 is a cross-section showing the device of FIG. 5 fully installed in a workpiece illustrating a modification.

DETAILED DESCRIPTION OF THE INVENTION

In FIGS. 1-3 there is shown a self-retaining safety bolt 10 according to the invention having a head 12, a cylindrical shank 14 extending along a axis 16, with a thread 18 at one end. A laterally-extending passage 20 traverses across the shank 14 at a location near the head. An axial passage 22 extends into the bolt from the head 12. At its bottom it forms a seat 24 for bias means 26. Bias means 26 conveniently comprises a coil compression spring set in seat 24.

A cam member 28 fits in the axial passage and is slidable axially therein. It has a nose 30 which is flush with the exterior surface of head 12 when the assembly is in its locked telescoped position. Cam member 28 carries a first cam surface 32 and a second cam surface 33 which face laterally oppositely from one another. They are preferably parallel to one another, and may conveniently be formed on a tongue 38. Cam surfaces 32 and 33 respectively bear against follower surfaces 34 and 35 on a dog 36. Dog 36 fits slidably in lateral-extending passage 20.

A contractor 40 is provided with a pin 41 which fits inside the coils of the bias means 26. It has a flat head which bears against the end of tongue 38. Alternately, contractor 40 can be formed unitarily with the cam member 28. A cross hole 44 is formed in a threaded end of the bolt cylindrical shank 14, to receive a cotter pin (not shown) in the locked, telescoped position which will be described in greater detail hereinafter.

Because follower surfaces 34, 35 (sometimes called "followers") respectively bear against cam surfaces 32 or 33, the cam member will be shifted axially in order to move the dog 36 laterally into or out of an extended position as a function of axial movement of the cam member.

In FIG. 4 a pin tail nut 46 is shown having a tubular shank 48 for telescoping engagement by the cylindrical shank 14 of the bolt 10. The radially enlarged head 50 has an internal thread and the usual slots 52 for locking with a cotter pin (not shown) in a manner known in the art. The interior bore 54 of the tubular shank 48 has a groove 56 for engagement by dog 30 of bolt 10 when the device is installed in a workpiece.

The device is shown installed in a workpiece in FIG. 5. Its two parts are telescoped together and locked together. The cylindrical shank of bolt 10 was enabled to slide into the tubular shank of the pin tail nut by retracting dog 36 by depressing cam member 28.

Cam member 28 is retained in the bolt by a swaged lip 62 formed at the edge of an annular slot 64 in the head of bolt 10. The bolt and the pin tail nut are telescopically engaged and screwed down until the dog 36 engages the groove 56 in the tubular shank of the pin tail nut 46. A cotter pin may be inserted in cross hole 44 through one of the slots 52 in the pin tail end. This securely locks the nut onto the shank of the bolt.

The operation of the self-retaining bolt assembly should be evident from the drawings. The shank of the pin tail nut 46 is inserted through a hole in a workpiece and the nut and bolt threaded together. The cylindrical shank 14 of the bolt 10 may then be inserted into the bore 54 of the tubular shank and the cam member 28 depressed as shown in FIG. 2 until the dog is retracted sufficiently so that the dog will pass into the bore of the pin tail nut. When the dog has reached the groove in the interior surface of the pin tail nut it will snap out to an extended position as shown in FIG. 5. The dog cannot then be retracted unless a axial load is applied on the nose end 30 of cam member 28. It securely locks the telescoping bolt and nut unless the cam member is "released" in this manner. The pin tail nut 46 has the usual hexagonal shape with flats for application of a wrench to tighten it until it draws the workpiece together by drawing the cylindrical shank 14 of the bolt into the tubular shank of the pin tail nut until the dog snaps into place in the groove 56. A cotter pin may then be passed through cross hole 44 between slots 52 in the pin tail end. The axial length of slot 56 is somewhat greater than that of the dog, so there can be some grip tolerance and so that a slot 52 may be aligned with hole 44 in the bolt for insertion of a cotter pin.

To remove the self-retaining safety bolt assembly, it is necessary first to remove the cotter pin and then unscrew the pin tail nut while simultaneously pressing the cam member to disengage the dog 36 until the dog abuts the wall of the passage. Pressing on the end of the cam member will cause the cam surface 32 to bear against the follower which will retract the dog into the bolt until the groove 56 has passed beyond the dog when unscrewing the pin tail nut. Thus two simultaneous actions must take place in order to remove the self-retaining safety bolt assembly. That is, the dog 36 cannot be removed from the slot 56 simply by depressing the cam member nor can the threads on pin tail nut be loosened by unscrewing without first releasing the dog 36.

Shoulder 62 can also function to form a seal with the cam member to exclude matter from the axial passage 22.

It will be noted that the dog and the cam member are in a push-pull relationship so that there is no possibility that the cam member can move axially while still leaving the dog inside the lateral passage. It can be seen from an examination of the cam member itself that the safety bolt is actually locked in place even though the dog is inside the tubular shank of the pin tail nut and cannot be seen. The angle of the cam surfaces is selected so that the dog can be moved by the cam member, but not vice versa. This is accomplished by appropriately selecting the angle relative to the coefficient of friction. The included angle between the axis of the cam member and the face of the cam will be smaller than the included angle between the axis of the dog and the face of the dog. The two faces are, of course, parallel.

An alternate embodiment of the device is illustrated in FIG. 6. In this FIG., bolt 70 is substantially the same as the bolt illustrated in FIG. 1 except that it has an undercut 72 under the head 12. Thus when installed in a hole 74 of a workpiece 76 the tubular shank of the pin tail nut 46 may extend beyond the exterior surface 74 of the workpiece 76 into the under cut 72 as shown. Thus under cut 72 provides additional tolerance between the end of the tubular shank of the pin tail nut and the head of the locking bolt 70. The purpose of this embodiment is to provide greater shear strength of bolt assembly. The self-retaining safety bolt assembly is installed in the manner as described above. However, the end 78 of the pin tail nut may pass beyond the exterior surface and into the undercut in the head.

This invention is not to be limited by the embodiments shown in the drawings and described in the description which are given by way of example and not of limitation, but only in accordance with the scope of the appended claims.

I claim:

1. A self-retaining safety bolt assembly comprising an element having a head, a cylindrical shank with an axis, and an outer cylindrical wall, the element having a first and a second end, an axial passage opening into one of said ends, and a laterally-extending passage in the cylindrical shank and intersecting the axial passage;

a dog in said laterally-extending passage slidably movable between an extended and a retracted position, whereby the dog extends beyond the maximum diameter of the cylindrical shank in the extended position and retracts entirely within said shank in the retracted position;

a cam member axially movable in said axial passage and reactive with said dog to retract or to extend the same;

said cylindrical shank having threads on one end;

biasing means biasing the cam member in a direction which forces the dog toward its extended position;

an element having a radially enlarged head and a tubular shank, said tubular shank having a cylindrical bore with an interior wall adapted closely to fit said outer cylindrical wall, said element having an internal thread;

said tubular shank having an interior groove in said interior wall being axially spaced from said threads in said last named element;

said tubular shank telescopically fitting over said cylindrical shank with the thread of said element engaging the threads on said cylindrical shank;

said dog being so disposed and arranged as to extend, when in its extended position, into said groove in at least one relative axial telescoped position of said elements, whereby to prevent separation of said elements unless said dog is retracted.

2. A safety bolt assembly according to claim 1 wherein the cylindrical shank has a cross hole in its threaded end to receive a cotter pin passing through a slot in said element.

3. A safety bolt assembly according to claim 1 wherein said axial passage extends into said head, said head being on said first end of said first-named element, said threads being on said second end thereof.

4. A safety bolt assembly according to claim 1 wherein the axial passage adjacent to said one end includes a swaged shoulder which is adapted to make a seal with the cam member and retains the end of the cam member flush with the end of the member having this cylindrical shank.

5. A safety bolt assembly according to claim 1 in which one end of the cam member is substantially coterminous with one end of the element having the cylindrical shank when the two members are telescopically engaged and the dog is in its extended position.

6. A safety bolt according to claim 1 in which the cam member has a tongue with a bearing surface which bears against a bearing surface on the dog to restrain the dog against rotation.

7. A safety bolt according to claim 1 in which a portion of the cam is non-circular, so as to prevent rotation of said cam.

8. A safety bolt according to claim 1 in which the angle of the cam surfaces and the follower surfaces relative to the axis is such as to permit cam actuation by axial force exerted on the cam member, but to lock against movement by forces exerted endwise on the dog.

9. A safety bolt according to claim 3 in which the angle of the cam surfaces and the follower surfaces relative to the axis is such as to permit cam actuation by axial force exerted on the cam member, but to lock against movement by forces exerted endwise on the dog.

* * * * *